US009787699B2

(12) United States Patent
Suominen

(10) Patent No.: US 9,787,699 B2
(45) Date of Patent: Oct. 10, 2017

(54) MALWARE DETECTION

(71) Applicant: F-Secure Corporation, Helsinki (FI)

(72) Inventor: Mikko Suominen, Helsinki (FI)

(73) Assignee: F-SECURE CORPORATION, Helsinki (FI)

( * ) Notice: Subject to any disclaimer, the term of this patent is extended or adjusted under 35 U.S.C. 154(b) by 0 days.

(21) Appl. No.: 15/334,775

(22) Filed: Oct. 26, 2016

(65) Prior Publication Data

US 2017/0126716 A1    May 4, 2017

(30) Foreign Application Priority Data

Oct. 30, 2015 (GB) .................................. 1519164.6

(51) Int. Cl.
*H04L 29/06* (2006.01)
(52) U.S. Cl.
CPC ........ *H04L 63/1416* (2013.01); *H04L 63/145* (2013.01); *H04L 63/1425* (2013.01)
(58) Field of Classification Search
CPC .................................................. H04L 63/1416
See application file for complete search history.

(56) References Cited

U.S. PATENT DOCUMENTS

| | | | | |
|---|---|---|---|---|
| 7,636,946 B2* | 12/2009 | Verma | ..................... | G06F 21/56 707/999.01 |
| 7,779,472 B1* | 8/2010 | Lou | ....................... | G06F 21/566 726/22 |
| 8,935,789 B2* | 1/2015 | Shukla | ................... | G06F 21/567 713/164 |
| 9,171,157 B2* | 10/2015 | Flores | ..................... | G06F 21/55 |
| 9,479,531 B1* | 10/2016 | Watson | ............... | H04L 63/1425 |
| 2004/0015712 A1* | 1/2004 | Szor | ....................... | G06F 21/566 726/24 |
| 2005/0114338 A1* | 5/2005 | Borthakur | ......... | G06F 17/30067 |

(Continued)

FOREIGN PATENT DOCUMENTS

| | | |
|---|---|---|
| GB | 2510641 A | 8/2014 |
| WO | WO-2015/100327 A1 | 7/2015 |

OTHER PUBLICATIONS

Combined Search and Examination Report under Sections 17 and 18(3) issued by the United Kingdom Intellectual Property Office in connection with GB 1519164.6 dated Apr. 29, 2016 (7 pages).

*Primary Examiner* — Ali Shayanfar
(74) *Attorney, Agent, or Firm* — Robert P. Michael, Esq.; Carter, DeLuca, Farrell & Schmidt, LLP

(57) ABSTRACT

There is provided a malware analysis method including at a computer device having an operating system and a memory: collecting Dynamic Link Library (DLL) data under a system folder, the data including at least the DLL name and all pairs of exported function names and function addresses relative to the starting address of the DLL once it has been loaded into memory; comparing the two least significant bytes of the collected function addresses with the two least significant bytes of absolute virtual addresses in a memory dump; deducing a list of potential targets for API function calls when there is a match between the compared two least significant bytes of the collected function addresses and the absolute virtual addresses; and quarantining or deleting malware from which the suspicious API function calls originated.

22 Claims, 2 Drawing Sheets

(56) References Cited

U.S. PATENT DOCUMENTS

| | | | |
|---|---|---|---|
| 2007/0240222 A1* | 10/2007 | Tuvell | G06F 21/56 726/24 |
| 2008/0016339 A1* | 1/2008 | Shukla | G06F 21/53 713/164 |
| 2010/0115619 A1* | 5/2010 | Burtscher | G06F 21/562 726/24 |
| 2012/0066681 A1* | 3/2012 | Levy | G06F 9/5027 718/1 |
| 2012/0331308 A1* | 12/2012 | Fernandez Gutierrez | G06F 21/72 713/190 |
| 2016/0019102 A1* | 1/2016 | Cui | G06F 9/542 719/328 |
| 2016/0055337 A1* | 2/2016 | El-Moussa | G06F 21/566 726/23 |
| 2016/0099960 A1* | 4/2016 | Gerritz | H04L 63/1433 726/23 |

* cited by examiner

MALWARE DETECTION

CROSS-REFERENCE TO RELATED APPLICATION

The present application claims priority under 35 USC 119 to Great Britain Patent Application Serial No. GB 1519164.6, filed Oct. 30, 2015, the entire disclosure of which is incorporated herein by reference.

TECHNICAL FIELD

The present invention relates to detection of malware on a computer system, and in particular to method and software used for detailed Windows malware analysis.

BACKGROUND

The term "malware" is short for malicious software and is used to refer to any software designed to infiltrate or damage a computer system without the owner's informed consent. Malware can include viruses, worms, trojan horses, rootkits, adware, spyware and any other malicious and unwanted software. Many computer devices, such as desktop personal computers (PCs), laptops, personal data assistants (PDAs) and mobile phones can be at risk from malware.

Computer users will typically run antivirus (AV) and/or internet security (IS) software applications, for example F-Secure's™ Internet Security applications, to detect malware and protect against malware attacks on their computer system. Detecting malware is challenging, as malware is usually designed to be difficult to detect, often employing technologies that deliberately hide the presence and processes of malware on a system. Consequently, anti-virus and internet security applications will use a large number of techniques in order to detect malware most effectively, and reduce the risk of any malware going undetected.

Because current Windows™ malware use extensive encryption and compression techniques to hide their functionality, analysing them typically requires reverse engineering a raw memory dump of the malicious code. This is because at that stage the malware has decrypted itself.

A critical part of malware analysis is figuring out what Microsoft Windows™ application programming interfaces (APIs) are called by the malicious code. Without this information the functionality of the malware cannot be established. Win APIs are the core set of application programming interfaces (APIs) available in the Microsoft Windows™ operating systems. Currently determining the API targets for a memory dump requires that the process from which the dump was created is still active. In fact, even rebooting the relevant computer is enough to render the memory dump useless because the load addresses of the DLLs that hold the API call targets change due to address space layout randomization (ASLR). ASLR is a computer security technique involved in protection from buffer overflow attacks. In order to prevent an attacker from reliably jumping to, for example, a particular exploited function in memory, ASLR randomly arranges the address space positions of key data areas of a process, including the base of the executable and the positions of the stack, heap and libraries.

Import target determining can be especially difficult with advanced threats that resolve all of their APIs manually instead of relying on the operation system performing that task. In such cases there is even less information available than normal in the memory dump to be used for determining API call targets because the usual import related data structures are not available. Another difficult example is malware that does not even contain the names of the APIs they call but instead just contain checksums of the names which are then used for fetching the addresses for the respective APIs. Forensic examination is often time sensitive and that is why speeding up the analysis of memory dumps significantly would be quite valuable.

As already mentioned, AV and IS applications utilise a number of detection methods when scanning for malware. There is of course always a need to add further detection methods, and in particular methods that can help to determine APIs used by malware even if only a raw memory dump of the malicious memory area exists and no other information about the APIs is available than their absolute virtual address.

SUMMARY

Various aspects of examples of the invention are set out in the claims.

According to an aspect of the invention, there is provided a method as specified in the claims.

According to an aspect of the invention, there is provided an apparatus as specified in the claims.

According to an aspect of the invention there is provided a non-transitory computer storage medium as specified in the claims.

According to an aspect of the invention, there is provided an apparatus including processing means configured to cause the apparatus to perform any of the embodiments as described in the claims.

According to an aspect of the invention, there is provided an apparatus including a processing system configured to cause the apparatus to perform any of the embodiments as described in the claims.

According to an aspect of the invention, there is provided an apparatus including means for performing any of the embodiments as described in the claims.

Embodiments of the invention are defined in the depended claims.

BRIEF DESCRIPTION OF THE DRAWINGS

Further aspects, features and advantages of the invention will become apparent to the reader of the following description of specific embodiments of the invention, provided by way of example only, with reference to the accompanying drawings, in which.

DETAILED DESCRIPTION

Figure 1:
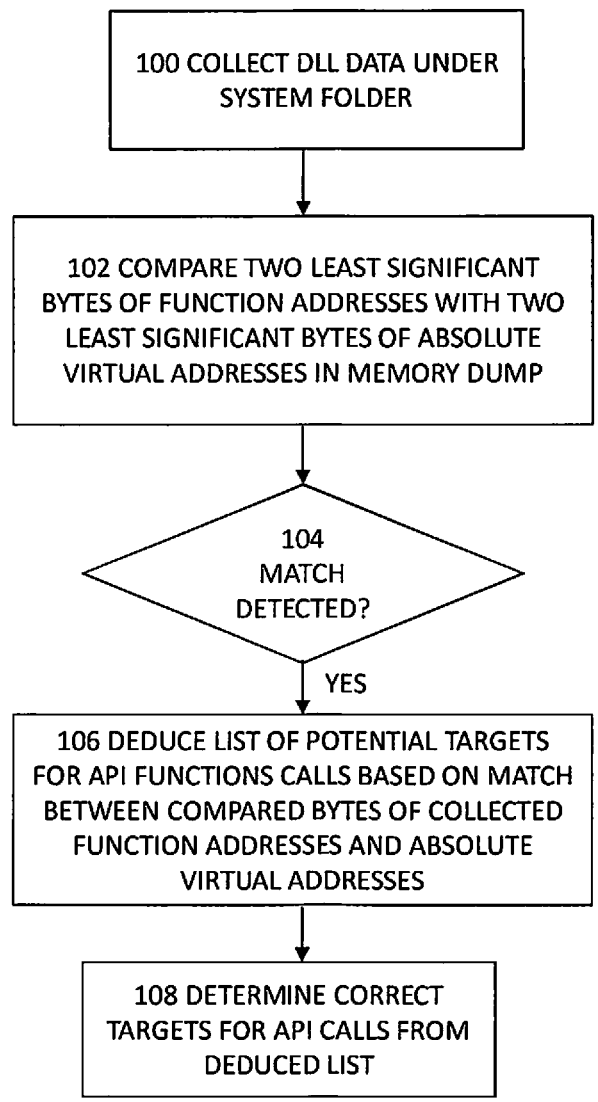
FIG. 1 is a flow diagram illustrating an example of the improved malware detection method.

The present invention can apply to any processing system, terminal, server, corresponding component, or to any computer system or combination of different communications systems that support the required functionality. Due to the rapid development of the specifications of computer systems and protocols that are used, all words and expressions should be interpreted broadly; they are intended only to illustrate the embodiment.

As discussed above, malware that is created to attack computer systems running Windows™ operating systems (for example Windows XP, Vista, Windows 7, Windows 8 or any future version) is constantly evolving, and improved techniques are required that can help to determine APIs used by malware. A particular problem to be addressed are situations where only a raw memory dump of the malicious memory area exists and no other information about the APIs is available than their absolute virtual address.

To determine which API call the virtual address leads to it is first required to determine which DLL that memory address belongs to and then what are the names of the functions beginning at that address. If the process from which the dump is from is still running, its memory space can be checked to see which DLL occupies that address. In that case, the export structures of the DLL can be checked to see what the name of the function beginning from that address is. However, starting from Windows Vista, the Windows operating system has randomized the load addresses of the system DLLs. Consequently if the system from which a malicious memory dump was created has been restarted since the creation of the dump, any absolute virtual address leading to a system DLL will lead to a different location that it was when the dump was created. An even more difficult case would be a situation where the infected system is no longer available for analysis at all.

The new method described herein will determine the targets of API calls by taking advantage of a limitation in the ASLR to get a list of potential targets for each API call and then optimizing the results by ruling out incorrect options with multiple different rules.

"Resources" (such as code and/or data) can be loaded into a process which is running on a computer system as process modules. These process modules are typically in the form of Dynamic Link Libraries (DLLs), but other code, which may be suspect or malicious, can also be injected into a process. In Microsoft Windows™ API, the DLL files are organized into sections. Each section has its own set of attributes, such as being writable or read-only, executable (for code) or non-executable (for data), and so on.

"System folder" is used by the operating system to store files necessary for proper function, a system folder is the primary location for DLL files. Two of the most common system folders are the c:\Windows\System32 folder for the 32-bit version of Microsoft Windows™ and c:\Windows\SysWOW64 for the 64-bit version. These folders are the primary location for system files.

"PE-executable", Portable Executable (PE), is a file format for executables, object code, DLLs and others used in 32-bit and 64-bit versions of Microsoft Windows™ operating systems. The PE format is a data structure that encapsulates the information necessary for the Microsoft Windows™ OS loader to manage the executable code. This includes dynamic library references for linking, API export and import tables, resource management data and thread-local storage (TLS) data.

"Memory dump" or system dump consist of the recorded state of the working memory of a computer program at a specific time. Other key pieces of program state are usually dumped at the same time, such as processor registers.

FIG. 1 is a flow diagram that illustrates an example method.

In step 100, DLL data is collected under system folder. This data consists of the name of the DLL and all pairs of exported functions names and their addresses in the DLL relative to the starting address of the DLL once it has been loaded into memory. The names and addresses can be located using information that is available in all PE-executables in their headers and standard data structures that describe the functions exported by the DLL.

To improve performance, this data can be stored into a separate file once it has been collected to avoid parsing a large number of DLLs for the same information. This step is required separately for each version of Windows because the addresses of functions can vary from version to version of the OSs. In an embodiment, the collected DLL data may thus be stored into a database, the database comprising DLL data in separate files for each version of the operating system.

In step 102, the two least significant bytes of the collected function addresses are compared with the two least significant bytes of absolute virtual addresses in a memory dump. When the ASLR picks load addresses for DLLs, it only picks addresses that are multiples of 0x10000. This means that the two least significant bytes of absolute virtual addresses in the memory dump are correct when compared to those in the export data of the DLLs. Thus going through the previously collected list (in step 100) of functions names and their addresses and comparing the two least significant bytes of the addresses in the list with the addresses in the memory dump, will yield a list of potential target functions for addresses in the memory dump.

In step 104, when there is a match between the compared two least significant bytes of the collected function addresses and the absolute virtual addresses, 106 is entered where a list of potential targets for API function calls is determined based on the detected match. The number of incorrect options is simply a matter of probabilities: how many different exported functions in different DLLs happen to have the same two least significant bytes in their addresses. Because the two least significant bytes alone make possible 65535 different addresses, there are only a few different potential targets and in some cases even just one.

Finally, in step 108, correct targets for API calls are determined from the list determined in step 104. The incorrect options can be ruled out by using one or more different methods.

In an embodiment, the correct targets for API calls are determined from the deduced list by assigning probabilities to different DLLs, wherein the probabilities are generated by analysing malicious executables and collecting statistical information on the frequency of executable function calls from different DLLs. For example malicious code is very likely to be using exported functions from DLLs such as kernel32.dll, ntdll.dll, ws2_32.dll and other libraries that contain core functionalities but are very unlikely to use for example Microsoft Foundation Class libraries. These probabilities can be automatically generated by analysing a large amount of malicious Windows executables and collecting statistical information on how often they call functions from different DLLs.

In an embodiment, correct targets for API calls are determined from the deduced list by identifying consecutive API addresses that are pointing to the same DLL as correct targets. Typically API addresses reside consecutively in the memory dump and addresses next to each other are pointing to the same DLL. Entries to different DLLs are separated by a sequence of zeros. Thus from the consecutive API addresses in the memory dump the correct option can be identified by selecting the option that is from the same DLL for those consecutive addresses. Functions from this DLL are with high probability the correct ones also for other addresses in the same zero-separates address sequence. Since incorrect options lead to random DLLs, it is very unlikely that for those consecutive entries there will be incorrect options that are from the same DLL.

In an embodiment, correct targets for API calls are determined from the deduced list by ruling out a potential target API function call when the API function call requires another API to be called before or after in order to work properly. Incorrect options can be ruled out if they require some other API to be called before or after them in order to work or perform a meaningful operation. For example, if one identified option for an API call is Process32Next, but none of the other addresses can be Process32First, then Process32Next can be ruled out because it cannot be successfully called without functionality performed by Process32First.

The final result is that at least most or even all API call targets will be identified from the memory dump by using the previously described methods. If some results are not narrowed down to one, their potential targets are cut down to just a couple of choices from which reverse engineering can deduce the correct one from the surrounding code.

Figure 2:
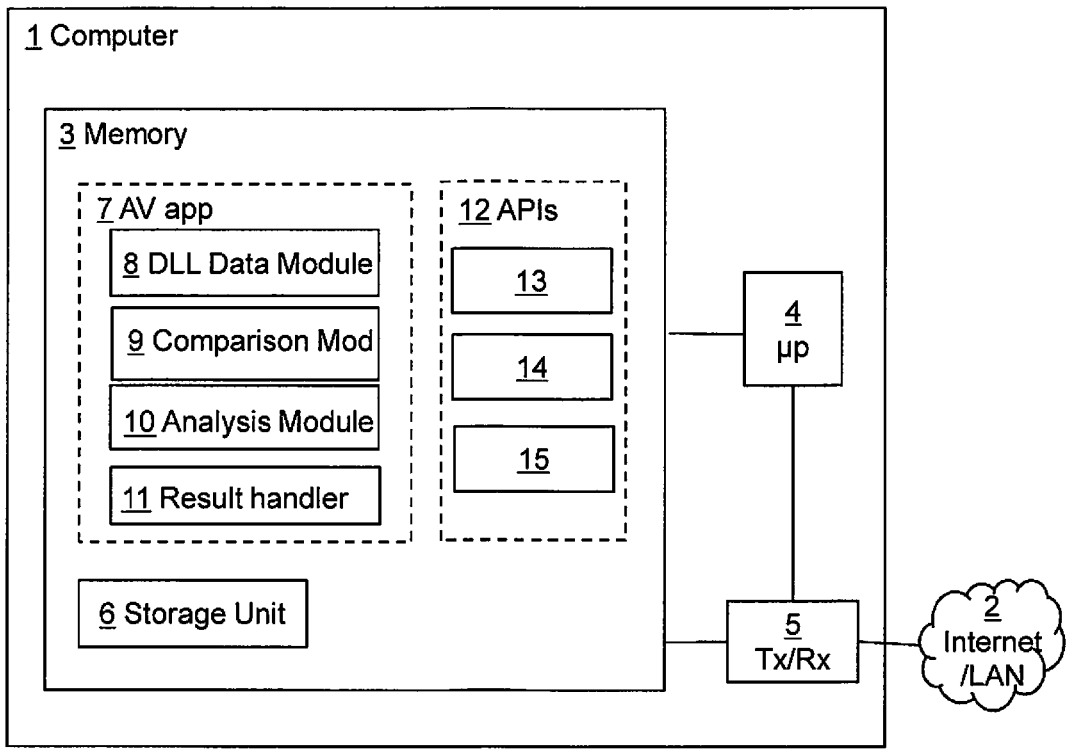
FIG. 2 is a schematic illustration of a computer system according to an embodiment.

FIG. 2 illustrates schematically a computer system comprising a computer 1 connected to a network 2 such as the internet or a local area network (LAN). The computer 1 is implemented as a combination of computer hardware and software. The computer 1 comprises a memory 3, a processor 4 and a transceiver 5. The memory 3 stores the various programs/executable files that are implemented by the processor 4, and also provides a storage unit 6 for any required data. The programs/executable files stored in the memory 3, and implemented by the processor 4, include a DLL Data Collection Module 8, a Comparison Module 9, an Analysis Module 10, and a Result handler 11, each of which can be sub-units of an antivirus application 7 (or internet security application). In addition, the memory 3 stores the Application Programming Interfaces (APIs) 12 to which processes can make function calls. FIG. 2 shows the Modules 13, 14 and 15 as examples of APIs.

The transceiver 5 is used to communicate over the network 2, and can be used by the antivirus software 7 to communicate with, for example, a central server or cluster of servers maintained by the antivirus software provider. Typically, the computer 1 may be any of a desktop personal computer (PC), laptop, personal data assistant (PDA), mobile phone, or any other suitable device.

The antivirus application 7 uses the DLL Data Collection Module 8 to carry out step 100 of the method described above. The Comparison Module 9 is then able to carry out step 102 of the method.

The Analysis Module 10 is then able to carry out steps 104 through 106 of the method described above. Finally the Result Handler 11 can be used to manage the results received from the Analysis Module 10. The Result Handler 11 may also be used to initiate further actions as a consequence of the result. For example, the Result Handler 11, or some other module on receiving instructions from the Result Handler, may terminate the process and/or thread that has been found to be running suspicious injected code. The Result Handler may also engage other aspects of the antivirus application, which can, for example, quarantine or delete the malware from which the suspicious functions originated.

Figure 3:
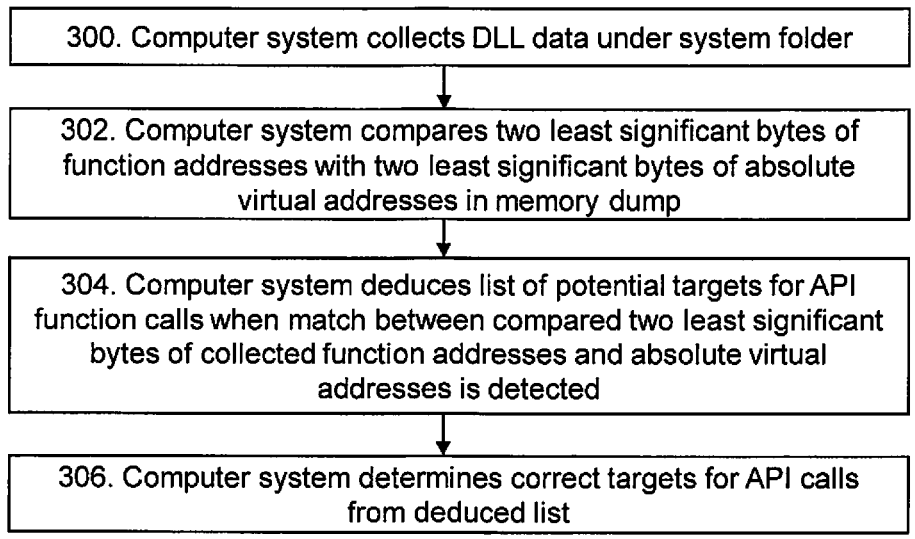
FIG. 3 is a flow diagram showing example steps at a computer system.

FIG. 3 is a flow diagram showing example steps at a computer system 1.

300. The computer system collects DLL data under system folder.

302. The computer system compares two least significant bytes of function addresses with two least significant bytes of absolute virtual addresses in the memory dump.

304. The computer system deduces a list of potential targets for API function calls when matches between compared two least significant bytes of collected function addresses and absolute virtual addresses are detected.

306. The computer system determines correct targets for API calls on the basis of the deduced list.

The steps, points, signalling messages and related functions described above in relation to FIGS. 1 and 3 are in no absolute chronological order, and some of the steps may be performed simultaneously or in a different order. Other functions may also be executed between the steps or within the steps, and other signalling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in one or more modules of hardware or combinations thereof. For software, implementation can be through modules, for example, procedures and functions that perform the functions described here. The software code may be stored in any suitable data storage medium that is readable by processors, computers, memory units or articles of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or an article of manufacture which can contain, store, or maintain programming, data or digital information for use by or in connection with an instruction execution system, including the processor in the exemplary embodiment.

An embodiment provides a computer program product that comprises a computer-readable medium bearing a computer program code that is embodied therein for use with a computer. The computer program code comprises a code for collecting Dynamic Link Library (DLL) data under a system folder, the data comprising at least the DLL name and all pairs of exported function names and function addresses relative to the starting address of the DLL once it has been loaded into memory; a code for comparing the two least significant bytes of the collected function addresses with the two least significant bytes of absolute virtual addresses in a memory dump; and a code for deducing a list of potential targets for API function calls when there is a match between the compared two least significant bytes of the collected function addresses and the absolute virtual addresses.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It will be appreciated by the person of skill in the art that various modifications may be made to the above described embodiments without departing from the scope of the present invention.

The invention claimed is:

1. A malware analysis method, the method comprising at a computer device having an operating system and a memory:
   collecting Dynamic Link Library (DLL) data under a system folder, the data comprising at least the DLL name and all pairs of exported function names and function addresses relative to the starting address of the DLL once it has been loaded into memory;
   comparing the two least significant bytes of the collected function addresses with the two least significant bytes of absolute virtual addresses in a raw memory dump;
   deducing a list of potential targets for API function calls when there is a match between the compared two least significant bytes of the collected function addresses and the absolute virtual addresses; and
   quarantining or deleting malware from which the suspicious API function calls originated.

2. The method of claim 1, wherein the names and addresses are located by using information available in PE-executable headers and standard data structures describing the functions exported by the DLL.

3. The method of claim 1, further comprising storing the collected DLL data into a database, the database comprising DLL data in separate files for each version of the operating system.

4. The method of claim 1, further comprising determining correct targets for API calls from the deduced list by assigning probabilities to different DLLs, wherein the probabilities are generated by analysing malicious executables and collecting statistical information on the frequency of executable function calls from different DLLs.

5. The method of claim 1, further comprising determining correct targets for API calls from the deduced list by identifying consecutive API addresses that are pointing to the same DLL as correct targets.

6. The method of claim 1, further comprising determining correct targets for API calls from the deduced list by ruling out a potential target API function call when the API function call requires another API to be called before or after in order to work properly.

7. The method of claim 1, further comprising determining correct targets for API calls from the deduced list by reverse engineering.

8. An apparatus comprising:
   one or more processors; and
   one or more computer-readable memories storing computer program code,
   the one or more processors being configured to execute the computer program code to cause the apparatus at least to:
   collect Dynamic Link Library (DLL) data under a system folder, the data comprising at least the DLL name and all pairs of exported function names and function addresses relative to the starting address of the DLL once it has been loaded into memory;
   compare the two least significant bytes of the collected function addresses with the two least significant bytes of absolute virtual addresses in a raw memory dump;
   deduce a list of potential targets for API function calls when there is a match between the compared two least significant bytes of the collected function addresses and the absolute virtual addresses; and
   quarantine or delete malware from which the suspicious API function calls originated.

9. The apparatus according to claim 8, wherein the apparatus is running an operating system.

10. The apparatus according to claim 8, wherein the one or more processors are configured to determine correct targets for API calls from the deduced list by any of the following: by identifying consecutive API addresses that are pointing to the same DLL as correct targets; by ruling out a potential target API function call when the API function call requires another API to be called before or after in order to work properly; by reverse engineering; by assigning probabilities to different DLLs, wherein the probabilities are generated by analysing malicious executables and collecting statistical information on the frequency of executable function calls from different DLLs.

11. A non-transitory computer storage medium having stored thereon computer program code, which when executed on by a processor, causes the processor to:
   collect Dynamic Link Library (DLL) data under a system folder, the data comprising at least the DLL name and all pairs of exported function names and function addresses relative to the starting address of the DLL once it has been loaded into memory;
   compare the two least significant bytes of the collected function addresses with the two least significant bytes of absolute virtual addresses in a raw memory dump;
   deduce a list of potential targets for API function calls when there is a match between the compared two least significant bytes of the collected function addresses and the absolute virtual addresses; and
   quarantine or delete malware from which the suspicious API function calls originated.

12. A malware analysis method, the method comprising at a computer device having an operating system and a memory:
   collecting Dynamic Link Library (DLL) data under a system folder, the data comprising at least the DLL name and all pairs of exported function names and function addresses relative to the starting address of the DLL once it has been loaded into memory;
   comparing only the two least significant bytes of the collected function addresses with only the two least significant bytes of absolute virtual addresses in a memory dump;
   deducing a list of potential targets for API function calls when there is a match between the compared only two least significant bytes of the collected function addresses and the absolute virtual addresses; and
   quarantining or deleting malware from which the suspicious API function calls originated.

13. The method of claim 12, wherein the names and addresses are located by using information available in PE-executable headers and standard data structures describing the functions exported by the DLL.

14. The method of claim 12, further comprising storing the collected DLL data into a database, the database comprising DLL data in separate files for each version of the operating system.

15. The method of claim 12, further comprising determining correct targets for API calls from the deduced list by assigning probabilities to different DLLs, wherein the probabilities are generated by analysing malicious executables and collecting statistical information on the frequency of executable function calls from different DLLs.

16. The method of claim 12, further comprising determining correct targets for API calls from the deduced list by identifying consecutive API addresses that are pointing to the same DLL as correct targets.

17. The method of claim 12, further comprising determining correct targets for API calls from the deduced list by ruling out a potential target API function call when the API function call requires another API to be called before or after in order to work properly.

18. The method of claim 12, further comprising determining correct targets for API calls from the deduced list by reverse engineering.

19. An apparatus comprising:
one or more processors; and
one or more computer-readable memories storing computer program code,
the one or more processors being configured to execute the computer program code to cause the apparatus at least to:
collect Dynamic Link Library (DLL) data under a system folder, the data comprising at least the DLL name and all pairs of exported function names and function addresses relative to the starting address of the DLL once it has been loaded into memory;
compare the two least significant bytes of the collected function addresses with the two least significant bytes of absolute virtual addresses in a memory dump;
deduce a list of potential targets for API function calls when there is a match between the compared two least significant bytes of the collected function addresses and the absolute virtual addresses; and
quarantine or delete malware from which the suspicious API function calls originated.

20. The apparatus according to claim 19, wherein the apparatus is running an operating system.

21. The apparatus according to claim 19, wherein the one or more processors are configured to determine correct targets for API calls from the deduced list by any of the following: by identifying consecutive API addresses that are pointing to the same DLL as correct targets; by ruling out a potential target API function call when the API function call requires another API to be called before or after in order to work properly; by reverse engineering; by assigning probabilities to different DLLs, wherein the probabilities are generated by analysing malicious executables and collecting statistical information on the frequency of executable function calls from different DLLs.

22. A non-transitory computer storage medium having stored thereon computer program code, which when executed on by a processor, causes the processor to:
collect Dynamic Link Library (DLL) data under a system folder, the data comprising at least the DLL name and all pairs of exported function names and function addresses relative to the starting address of the DLL once it has been loaded into memory;
compare only the two least significant bytes of the collected function addresses with only the two least significant bytes of absolute virtual addresses in a memory dump;
deduce a list of potential targets for API function calls when there is a match between the compared two least significant bytes of the collected function addresses and the absolute virtual addresses; and
quarantine or delete malware from which the suspicious API function calls originated.

* * * * *